United States Patent [19]

Lask

[11] 4,389,493

[45] Jun. 21, 1983

[54] PROCESS FOR THE PRODUCTION OF SILICON-CONTAINING AND CARBON-CONTAINING RAW MATERIAL MOLDINGS, AND THE USE OF SUCH MOLDINGS

[75] Inventor: Gert-Wilhelm Lask, Uberhenn, Fed. Rep. of Germany

[73] Assignee: International Minerals & Chemical Luxembourg Societe Anonyme, Luxembourg, Luxembourg

[21] Appl. No.: 252,063

[22] Filed: Apr. 8, 1981

Related U.S. Application Data

[63] Continuation-in-part of Ser. No. 242,991, Mar. 12, 1981, abandoned.

[30] Foreign Application Priority Data

Mar. 14, 1980 [DE] Fed. Rep. of Germany ....... 3009808

[51] Int. Cl.³ ............................................. C04B 35/52
[52] U.S. Cl. .................................... 501/154; 264/122; 423/349
[58] Field of Search ................ 264/122, 109; 501/154; 423/349

[56] References Cited

U.S. PATENT DOCUMENTS

| | | | |
|---|---|---|---|
| 2,561,266 | 7/1951 | Dietert | 264/109 |
| 2,623,243 | 12/1952 | Jean et al. | 264/109 |
| 3,231,649 | 1/1966 | Pfeiffer | 264/109 |

*Primary Examiner*—James R. Hall
*Attorney, Agent, or Firm*—Karl F. Ross; Herbert Dubno

[57] ABSTRACT

In the production of silicon or silicon-alloy bodies in which a shaped pre-form, blank or like member containing a silicon carrier and carbon is subjected to an electric furnace, the fine-grain silicon carrier intimately mixed with preferably a stoichiometric amount of caking coal and the mixture is molded to form the body which is subjected to hot briquetting at a temperature of 350° to 550° C. as is used for the hot briquetting of coal.

5 Claims, No Drawings

PROCESS FOR THE PRODUCTION OF SILICON-CONTAINING AND CARBON-CONTAINING RAW MATERIAL MOLDINGS, AND THE USE OF SUCH MOLDINGS

CROSS-REFERENCE TO RELATED APPLICATIONS

This application is a continuation-in-part of copending application Ser. No. 242,991 filed Mar. 12, 1981, now abandoned.

FIELD OF THE INVENTION

My present invention relates to a process for the production of silicon-containing and carbon-containing raw material bodies for the production of silicon or silicon alloys, especially ferrosilicon alloys, in an electric furnace.

The invention also relates to a method of making silicon or silicon alloys especially ferrosilicon alloys and to the alloys made by this process.

BACKGROUND OF THE INVENTION

As will be developed in greater detail hereinafter, it has already been proposed to combine a silicon-containing compound or raw material with a carbon-containing material, generally a bituminous binder, and to shape the resulting mixture into bodies which can be subjected at high temperatures, especially those of electric furnaces, to a reaction which liberates silicon from the silicon carrier. The term "silicon carriers" as used in this invention denotes $SiO_2$ carriers, e.g. sand, ground quartzite and the like. The electric furnaces in which the silicon or silicon alloys are produced are generally electric pit furnaces, although other electric furnaces can be used.

With the prior art, a bituminous binder, e.g. coal-tar pitch, is added to the mixture. Briquetting is therefore carried out with the use of a binder. The resulting raw material moldings tend to soften and flow in the electric furnace in which the silicon or silicon alloy is produced.

In the prior art it is also known to carry out briquetting without a binder in the cold state under high pressure. The resulting raw material moldings disintegrate in the electric furnace. In practice, therefore, the use of raw material moldings prepared in the manner described has not been disclosed for the production of silicon or silicon alloys. The following remarks apply in detail to the prior art and the existing problems:

The production of silicon and silicon alloys from $SiO_2$ used in the form of sand or prepared quartzites is carried out mainly in electric furnaces using an addition of carbon carriers such as coke, petroleum coke, coal, wood charcoal, wood, sawdust and the like. In practice there is a large number of formulations kept very secret by the individual manufacturers. This is a reliable indication that operations are carried out empirically and the preparation of the charge for the electric furnace cannot be carried out in accordance with exact physico-chemical considerations.

Gaseous SiO is formed and reacts with the carbon in the immediate vicinity, although it can escape through gaps in the furnace charge aggregate and condense in the colder parts of the furnace. In any case, both reaction steps require close contact between $SiO_2$ and reducing agent. The two substances are therefore homogeneously mixed in a finely ground form.

In an electric furnace, however, materials in dust form are difficult to handle so that grinding and homogenization are followed by compaction. This results in the problems already described. Attempts have been made to convert the mixture to appropriate cokes in conventional chamber ovens. This has not been successful, because even if pitches are added, the caking properties of the best high volatile coal are not sufficient to bind more than 20% of the silicon carriers firmly in the coke carbon structure, while stoichiometrically 60 to 70% silicon carriers are required.

OBJECTS OF THE INVENTION

It is therefore an object of the invention to provide a method which will produce raw material moldings which satisfy all requirements in the electric furnace, more particularly as regards stability, energy consumption, reducing behavior and stoichiometry.

Yet another object of the invention is to provide an improved method of making silicon or silicon alloys whereby disadvantages of earlier systems are avoided.

Still another object of the invention is to provide improved shaped bodies or briquettes which can be effectively subjected to the high temperatures of electric furnaces in the production of silicon and silicon alloys.

DESCRIPTION OF THE INVENTION

To this end, according to the invention, the fine-grained silicon carrier is mixed with a proportion of caking coal and the mixture is molded into raw material moldings at a temperature of about 350° to 550° C. as in the hot briquetting of coal.

More particularly I have found that when a carbon carrier is mixed with caking coal or with caking and an equivalent carbon carrier proportion such that the carbon contributed by the carbon carriers present is stoichiometrically equivalent to the amount required for complete transformation of the silicon carrier to elemental silicon or a corresponding alloy, the resulting intimate mixtures can be compacted at temperatures of 350° C. to 550° C. by techniques which have found use in the hot briquetting of coal, in the absence of bituminous binders (although these can be present in amounts less than the stoichiometric carbon requirements) to provide highly stable and reactive briquettes which, upon being subjected to the high temperatures of the electric furnace, produce a high grade silicon product.

The preferred carbon carrier has been referred herein as caking coal, this term being used in its conventional sense to refer to coal which softens and agglomerates on heating and, after volatile matter has been driven off, produces a hard grey cellular mass of coke. In general, the agglomerating coals of class II which contain between 60% and 80% fixed carbon are preferred. Such coals are also referred to as bituminous in rank from a high volatile A to low volative coal.

Equivalent materials such as petroleum coke can also be employed along with other carbon carriers as developed below.

While any standard operations used in the hot briquetting of coal can be employed, mention may be made that briquetting pressures ranging between 20 and 60 metric tons generally will suffice. The silicon carrier and the caking coal can be present in the mixture in any particle size used in hot briquetting, the preferred particle size being less than 5 mm and most advantageously a particle size from 0.05 to 1 mm.

In a preferred aspect of the invention, the mixture is briquetted into a raw material moldings with a weight of 10 to 100 g, preferably 20 to 60 g.

The stoichiometric conditions governing the reduction can be allowed for within the invention. In this connection it is advisable for the mixture to be so composed that the carbon content of all the carbon carriers is about 40% by weight of the $SiO_2$ contained in the silicon carrier.

A well-proven process is characterized in that about 60–70% by weight of silicon carrier, about 20 to 30% by weight of caking coal, and about 10 to 20% by weight of other carbon carriers, such as non-caking coal and/or cokes and/or petroleum coke and/or organic compounds, are mixed, and this mixture is hot-briquetted.

Surprisingly, according to the invention, silicon carriers and caking coal are so briquetted that all of the carbon required for the reduction is present in the briquette. It originates from the caking coal and, if this supply is inadequate, from other carbon carriers selected as appropriate.

In calculating the composition of the briquette, it is preferable to take the stoichiometric mix as the basic;

$$SiO_2 + 2C \longrightarrow Si + 2CO$$

60 + 24 = 28 + 56 or
1000 kg $SiO_2$ require 400 kg C or
71.4 kg $SiO_2$ require 28.6 kg C or
2.5 kg $SiO_2$ require 1.0 kg C.

It is known that the outer surface of the material for briquetting plays an important part in respect of bonding of the binder during briquetting. This surface depends overall on the grain structure and the microstructure of the grain surfaces. The inner surface of the grains can in most cases be disregarded. Consequently, the same volume of binder is required for different materials for briquetting, given similar grain-size and surface structure. Referred to the mass proportions, the proportion of binder in the mixture decreases with an increasing specific mass of the material for briquetting. If the carbon carrier in the hot briquette—also known as molded coke—is replaced by quartz, the specific mass of the material for briquetting rises from 1.2–1.5 to 2.65 g/cm$^3$. Consequently, the proportion of binder required can be reduced from 30±3% to 22±3%. Depending upon the ballast and volatile content of the binder coal used, a carbon content of about 16.5±2% remains after hot-briquetting. It will be apparent from the stoichiometric calculations that this proportion of carbon is too low. It can be increased by increasing the proportion of binder coal or by the addition of other non-caking carbon carriers, such as anthracite, petroleum coke, low-temperature coke or high-temperature coke, all of which are used in the mixture instead of the quartz. If non-caking carbon carriers are used, the binder coal must be increased appropriately for the above reasons.

SPECIFIC EXAMPLES

Example 1

63.5 parts by mass of sand +36.5 parts by pass of caking coal. Given 70% carbon yield from the coal, the equation becomes 63.5 parts by mass of sand +25.55 parts by mass of carbon or 1000 kg of sand to 402 kg of carbon.

The result is in accordance with the stoichiometric calculations. In actual practice the proportions required must also take into account the fact that the coal ash contains 50% $SiO_2$, which is also reduced and accordingly requires carbon.

Example 2

66 parts by mass of sand +12 parts by mass of petroleum coke +22 parts by mass of caking coal. The carbon yield of the petroleum coke is 90%, that of the coal 70%. 66 parts sand +(10.8+15.4) parts carbon or 1000 kg sand +397 kg C.

The result is just in keeping with the stoichiometric calculations. Here again a correction must be made to allow for the caking coal ash.

The examples show that the reduction requirements can be matched to the carbon supply on the briquetting side, so that no obstacles need be expected in the use of hot briquettes in the electric furnace.

I claim:

1. A method of making silicon-and-carbon-containing bodies capable of being treated in an electric furnace to produce silicon or a silicon alloy, comprising the steps of mixing a fine-grain silicon carrier in the form of $SiO_2$ with fine-grain caking coal to form a substantially binder-free mixture, and hot briquetting the substantially binder-free mixture at a temperature of 350° to 550° C. to coherent briquettes constituting said bodies, the carbon content being about 40% by weight of the silicon carrier.

2. The method defined in claim 1 wherein the mixture is briquetted into briquettes individually weighing 10 to 100 grams.

3. The method defined in claim 2 wherein said briquettes weigh 20 to 60 grams each.

4. The method defined in claim 1 wherein said mixture is formed of 60 to 70% by weight of the silicon carrier, 20 to 30% by weight of caking coal and about 10 to 20% by weight of at least one other carbon carrier selected from the group which consists of noncaking coals, coke and petroleum residues.

5. The briquettes made by the method of claim 1.

* * * * *